(12) United States Patent
Blondelet et al.

(10) Patent No.: US 8,419,022 B2
(45) Date of Patent: Apr. 16, 2013

(54) MOTOR VEHICLE WHEEL MOUNTING COMPRISING A BINARY ACTUATOR FOR ADJUSTING THE ANGULAR POSITION OF THE PLANE OF A WHEEL

(75) Inventors: Michel Blondelet, Le Crest (FR); Serge Nicolas, Clermont-Ferrand (FR)

(73) Assignees: Societe de Technologie Michelin, Clermont-Ferrand (FR); Michelin Recherche et Technique S.A., Granges_Paccot (CH)

( * ) Notice: Subject to any disclaimer, the term of this patent is extended or adjusted under 35 U.S.C. 154(b) by 572 days.

(21) Appl. No.: 12/601,085

(22) PCT Filed: May 16, 2008

(86) PCT No.: PCT/FR2008/000686
§ 371 (c)(1),
(2), (4) Date: Nov. 20, 2009

(87) PCT Pub. No.: WO2008/155486
PCT Pub. Date: Dec. 24, 2008

(65) Prior Publication Data
US 2010/0156057 A1  Jun. 24, 2010

(30) Foreign Application Priority Data

May 23, 2007  (FR) ..................... 07 03667

(51) Int. Cl.
*B62D 17/00* (2006.01)
(52) U.S. Cl.
USPC ..................... 280/5.521; 280/5.52

(58) Field of Classification Search ............... 280/86.75, 280/5.52
See application file for complete search history.

(56) References Cited

U.S. PATENT DOCUMENTS

| | | | | | |
|---|---|---|---|---|---|
| 4,236,728 | A | * | 12/1980 | Policy et al. | 280/5.521 |
| 4,600,215 | A | * | 7/1986 | Kuroki et al. | 280/5.519 |
| 4,747,614 | A | * | 5/1988 | Kuroyanagi et al. | 280/86.75 |
| 4,752,079 | A | * | 6/1988 | Fahrner | 280/5.52 |
| 4,770,430 | A | * | 9/1988 | Lange | 280/81.6 |
| 4,796,911 | A | * | 1/1989 | Kuroki et al. | 280/5.511 |
| 5,069,302 | A | * | 12/1991 | Kageyama | 180/197 |
| 5,156,414 | A | * | 10/1992 | Fayard et al. | 280/86.75 |
| 5,292,149 | A | * | 3/1994 | Luger | 280/5.521 |
| 5,438,515 | A | * | 8/1995 | Miichi et al. | 701/36 |
| 5,560,640 | A | * | 10/1996 | Lee | 280/5.52 |
| 6,279,920 | B1 | * | 8/2001 | Choudhery | 280/5.521 |
| 6,293,561 | B1 | * | 9/2001 | Goetzen et al. | 280/5.52 |
| 6,962,355 | B2 | * | 11/2005 | Kwon | 280/86.75 |

(Continued)

FOREIGN PATENT DOCUMENTS

DE  10045956 A1  3/2002
JP  5178042 A  7/1993

*Primary Examiner* — Nicole Verley
(74) *Attorney, Agent, or Firm* — Bachman & LaPointe, P.C.

(57) ABSTRACT

A motor vehicle wheel set-up via a wheel holder is provided, which wheel holder is associated with the vehicle via at least one pivot in such a way that the plane of the wheel can exhibit first and second angular running positions. The set-up further has a binary actuator that has a fixed component and a moving component capable of translational movement with respect to the fixed component, moving component being secured to the wheel holder and the actuator comprising a device for the binary control of the moving member placing it in one of two stable states each allowing the wheel holder to be moved into an angular position corresponding to one angular position of the wheel plane.

12 Claims, 2 Drawing Sheets

U.S. PATENT DOCUMENTS

| | | | |
|---|---|---|---|
| 7,878,511 B2 * | 2/2011 | Haeusler et al. | 280/5.52 |
| 7,984,915 B2 * | 7/2011 | Post et al. | 280/5.524 |
| 8,050,819 B2 * | 11/2011 | Suyama et al. | 701/37 |
| 8,051,942 B2 * | 11/2011 | Sasaki et al. | 180/410 |
| 8,128,110 B2 * | 3/2012 | Sacli | 280/124.106 |
| 8,177,010 B2 * | 5/2012 | Glavinic et al. | 180/209 |
| 2003/0111812 A1 | 6/2003 | Carlstedt et al. | |
| 2004/0178595 A1 * | 9/2004 | Coggin et al. | 280/86.758 |
| 2006/0197301 A1 * | 9/2006 | Kunert et al. | 280/124.165 |
| 2006/0220335 A1 * | 10/2006 | Damm | 280/86.757 |
| 2011/0040456 A1 * | 2/2011 | Blondelet et al. | 701/49 |

\* cited by examiner

MOTOR VEHICLE WHEEL MOUNTING COMPRISING A BINARY ACTUATOR FOR ADJUSTING THE ANGULAR POSITION OF THE PLANE OF A WHEEL

BACKGROUND

Field on the Invention

The invention relates to a wheel mounting of a motor vehicle wherein at least one wheel can be shifted by a binary actuator according to two angular positions, as well as an adjustment method of the angular rolling position of the plane of a wheel of such a mounting.

The invention applies in particular to the mounting of non-guiding wheels of the motor vehicle, in particular to a mounting of wheels of a rear axle.

Rear axles of motor vehicles are known whereon the angular position of the wheel plane is servo-controlled by conditions of rolling by the intermediary of an actuator. As such, it is possible to continuously adjust the angular position of said wheel plane according to the dynamic rolling situation, in such a way that in particular the taking of curves of the vehicle is improved.

However, the implementation of these embodiments involves major complexity, in particular relative to the performance of the actuator. Furthermore, entailing a function required for the dynamic behaviour of the vehicle, the constraints for securing its operation are of utmost stringency.

Moreover, in order to improve the dynamic behaviour of the vehicle, it is known to statically adjust the angular rolling position of the plane of the wheel of an axle, in particular by mounting said wheel in such a way that it has pinch angle and possibly a camber angle that are non-zero.

The pinch angle is defined as being the angle separating, in a horizontal plane parallel to the ground, the plane of the wheel from the median plane of the vehicle. When the front of the wheel shifts towards the interior, respectively towards the exterior, this is referred to as pinch, respectively opening. The camber angle is the angle of the wheel plane with the vertical axis, the camber being positive if the wheel leans towards the exterior of the vehicle.

However, during the rolling, the angular shift between the wheel plane and the frame of the vehicle induces a greater stress on the tyre as well as an overconsumption of fuel due to the resistance to rolling which results.

SUMMARY OF THE INVENTION

The invention aims to propose a wheel mounting of a motor vehicle which makes it possible to improve the energy output of the rolling as well as the safety of the dynamic behaviour of the vehicle, the design of said mounting being particularly simple, from the standpoint of the specifications of the actuator as well as in relation to the validation procedures specific to the functions intervening on the dynamic behaviour of said vehicle.

To this effect, according to a first aspect, the invention proposes a wheel mounting of a motor vehicle by the intermediary of a wheel holder, said wheel holder being associated with said vehicle by the intermediary of at least one pivot in such a way that the plane of the wheel can have a first and a second angular rolling position, said mounting further comprising a binary actuator having a fixed member and a moving member capable of translational movement in relation to said fixed member, said moving member being secured to the wheel holder and said actuator comprising a device for the binary control of the moving member in two stable states each making it possible the shifting of the wheel holder in an angular position corresponding to an angular position of the wheel plane.

According to a second aspect, the invention proposes an adjustment method of the angular rolling position of the plane of a wheel of such a mounting, said method providing to maintain the plane of the wheel in a second angular position during the rolling of said wheel and, in the event of detection of at least one critical rolling parameter, to activate the device for the control in such a way as to shift the wheel plane in the first angular position during a predetermined time period before the returning of said plane of the wheel in second angular position.

BRIEF DESCRIPTION OF THE DRAWINGS

Other objects and advantages of the invention will appear in the following description, made in reference to the annexed figures wherein.

DETAILED DESCRIPTION OF THE PREFERRED EMBODIMENT(S)

The invention relates to a wheel mounting of a vehicle by the intermediary of a wheel holder. In particular, the mounting is carried out on the axle carrying the non-guiding wheels of the vehicle, in particular the invention applies to a rear axle. According to an embodiment, the axle can be of the type comprising a cross member on each of the ends whereon a wheel is mounted according to the invention. According to another embodiment, the axle can be of the multi-arm type.

At least one, and in particular each, wheel holder is associated with the vehicle by the intermediary of at least one pivot in such a way that the plane of the wheel can have a first and a second angular rolling position. The wheel holder can be secured to the shell of the vehicle or to an underframe in order to facilitate the assembly of the vehicle and better filter the vibrations.

In an example of an embodiment, the angular rolling positions are selected from among the pinch angle, the camber angle or a combination of these two angles. In particular, the second angular position can correspond to a pinch angle and/or to a camber angle substantially zero, the first angular position corresponding to a pinch angle and/or to a non-zero camber angle.

In examples of embodiments, the second angular position corresponds to pinch and camber angles of 0°, the first angular position corresponding to a pinch angle less than 0.5°, in particular 0.35°, and to a zero camber angle. Alternatively, the pinch angle of the first angular position can be of a magnitude of 1°, or less.

The mounting further comprises, in particular for each wheel, a binary actuator having a fixed member 1 and a moving member 2 in translation in relation to said fixed member. The actuator comprises a device for the binary control of the moving member 2 in two stable states. As such, the binary actuator has only two stable states, with the passing from one to the other taking place without possibility of adjusting in the succession of intermediary positions. In particular, a binary actuator is differentiated therefore from an actuator for servo-controlling wherein the device for the control applies instructions in order to provide a quasi-continuous adjustment in a plurality of successive positions.

By providing that the moving member 2 is secured to the wheel holder, each stable state of the moving member 2 makes possible the shifting of the wheel holder in an angular position corresponding to an angular position of the wheel plane. Furthermore, the stable states can be adjustable, in particular in order to vary the angular range between the two angular positions of the wheel plane.

Figure 1A:
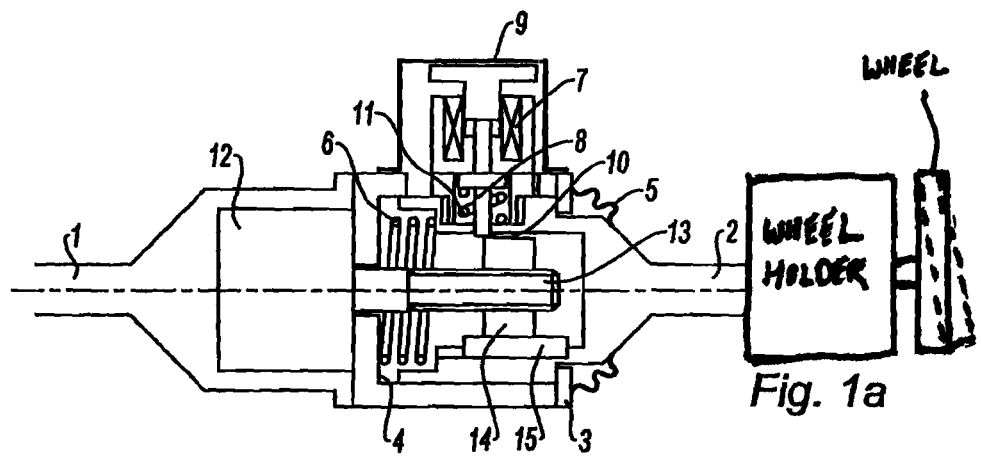
FIG. 1 are cross-section and partial schematic representations showing a suspension arm of a wheel mounting wherein a binary actuator according to a first embodiment is installed, respectively in a first stable state (FIG. 1a), in a position of absorbing (FIG. 1b) and in a second stable state (FIG. 1c)

In particular, the first stable state (FIGS. 1a, 2a) corresponds to the first angular position wherein at least the pinch angle is non-zero, the second stable state (FIGS. 1c, 2c) corresponding to the second angular position wherein at least the pinch angle is substantially zero.

In relation to the figures, two embodiments of a wheel mounting are described wherein the actuator is installed on a suspension arm of a multi-arm axle, with each one of the members 1, 2 forming a portion of said arm. Alternatively, the actuator can be installed to actuate a cross-bar or be embedded at the end of the arm in the wheel holder.

The fixed member 1 comprises a housing wherein the moving member 2 is slidingly mounted between two axial thrust bearings 3, 4 defining the position of the moving member 2 respectively in its first and second stable states. Furthermore the junction zone between the members 1, 2 is sealed by a bellows 5.

The actuator comprises a means of elastic constraint of the translation of the moving member 2 from its second towards its first stable state, and a device for blocking said translation in the second stable state. Moreover, the actuator comprises a motor device for the returning of the moving member 2 from its first towards its second stable state.

As such, it is possible to block the moving member 2 in its second stable state and, via unblocking, to arrange it very rapidly in its first stable state under the effect of the means of elastic constraint 6. Then, the motor device can provide the returning of the moving member 2 in its second stable state while waiting for a later unblocking.

In the embodiments described, the device for blocking comprises an electromagnet 7 which is secured to the moving member 2, the rod 8 of said electromagnet can be shifted in order to be engaged, respectively disengaged, in the members 1, 2 in order to block, respectively unblock, the translation of said members. More precisely, the electromagnet 7 is arranged under a protective cover 9, the rod 8 being mounted radially across from an engage bore 10 of the end of the rod 8 through said moving member. Furthermore, the rod 8 is mounted, using a spring 11, in elastic constraint in relation to the moving member 2, in such a way as to release said rod in the event of deactivation of said electromagnet. Alternatively, an unblocking can be provided using a trigger mounted in rotation, said rotation being actuated by the rod of the electromagnet.

This embodiment makes it possible, as soon as the rod 8 exits from the bore 10, to open the electromagnet 7 in such a way as to decrease the electric voltage at its terminals to the strict minimum so that it does not open. As such, it is possible to maintain the moving member 2 in its second state with minimum electrical consumption.

According to the embodiment in FIG. 1, the motor device comprises, secured to the fixed member 1, a micro gear motor 12 shifting a screw 13 whereon is mounted a nut 14. The nut 14 is stopped in rotation by a wedge 15 secured to the moving member 2 and said nut forming an engage thrust bearing of the rod 8. Alternatively, the rod 8 can form a stop wedge in rotation of the nut 14.

Figure 1B:
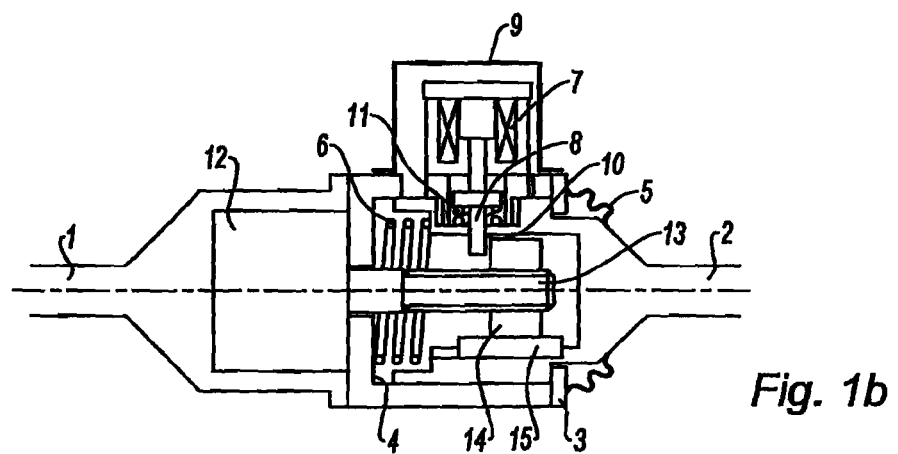
Figure 1C:
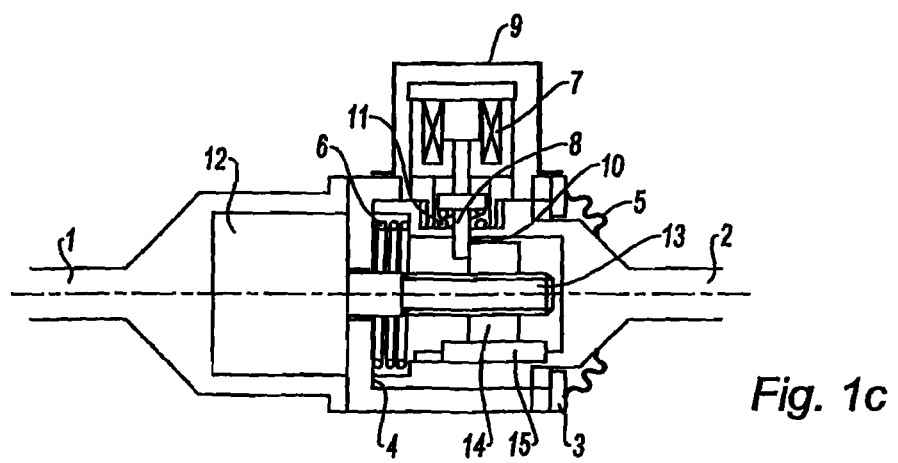
Figure 2A:
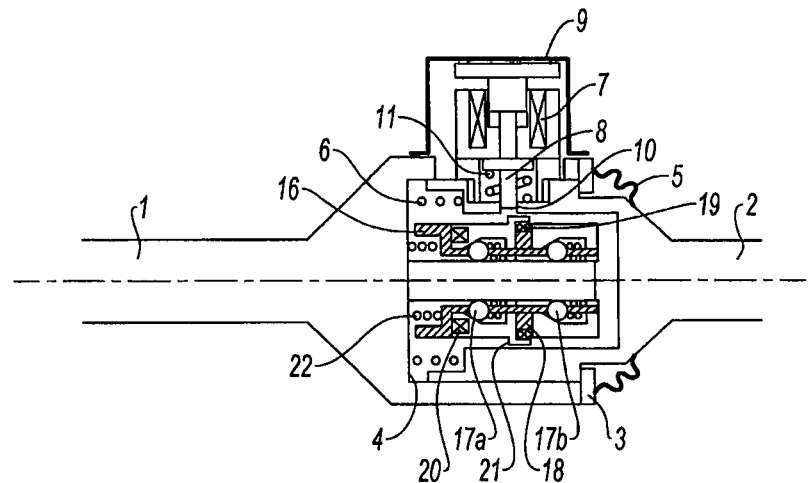
FIG. 2 are cross-section and partial schematic representations showing a suspension arm of a wheel mounting wherein a binary actuator according to a second embodiment is installed, respectively in a first stable state (FIG. 2a), in a position of absorbing (FIG. 2b) and in a second stable state (FIG. 2c).

From the first stable state (FIG. 1a), the retaking of said moving member is provided by rotation of the gear motor 12 in a direction away from the nut 14 relative to the rod 8 in such a way as to allow the thrusting of the latter on said nut (FIG. 1b). Then, by rotation of the gear motor 12 in the other direction, the moving member 2 is brought back in its second stable state by causing the compression of the means of elastic constraint 6 (FIG. 1c).

According to the embodiment in FIG. 2, the motor device comprises a carriage 16 carrying a set of two tapered ball thrust bearings 17a, 17b which are connected together by a structure 18 with piezoelectric deformation and, in parallel to the latter, a means of extension spring 19. The motor device further comprises an electromagnet 20 for unblocking balls of thrust bearings 17a, 17b, the thrust bearing 17a comprising an engage penetration 21 of the end of the rod 8.

As such, the carriage 16 can shift towards the fixed member 1 under the effect of vibrations of the piezoelectric structure 18. By expanding, the piezoelectric structure 18 presses against the second tapered thrust bearing 17b which is wedged in position relative to the fixed member 1 by the intermediary of its balls. The piezoelectric structure 18 then pushes the first tapered thrust bearing 17a towards the fixed member 1, which retains its shifting relative to said fixed member by the intermediary of its balls. When the piezoelectric structure 18 retracts, the extension spring 19 recalls the second tapered thrust bearing 17b which then retains its new position. By repeating this cycle several times, the carriage 16 shifts progressively from the moving member 2 towards the fixed member 1.

Figure 2B:
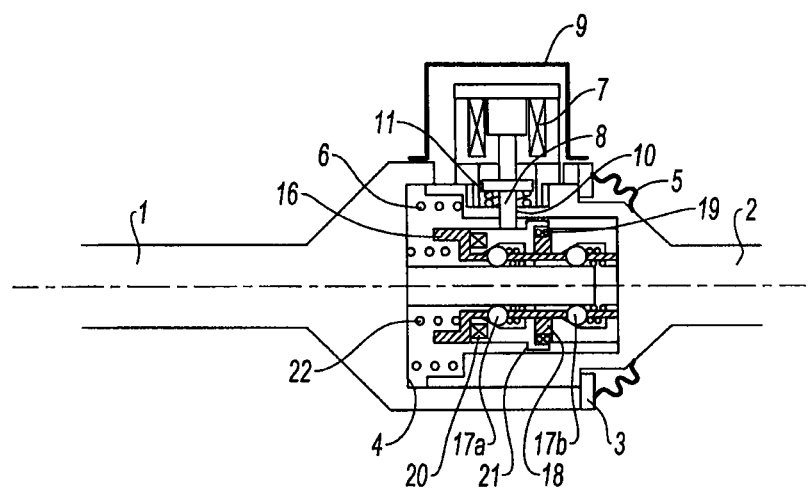
Figure 2C:
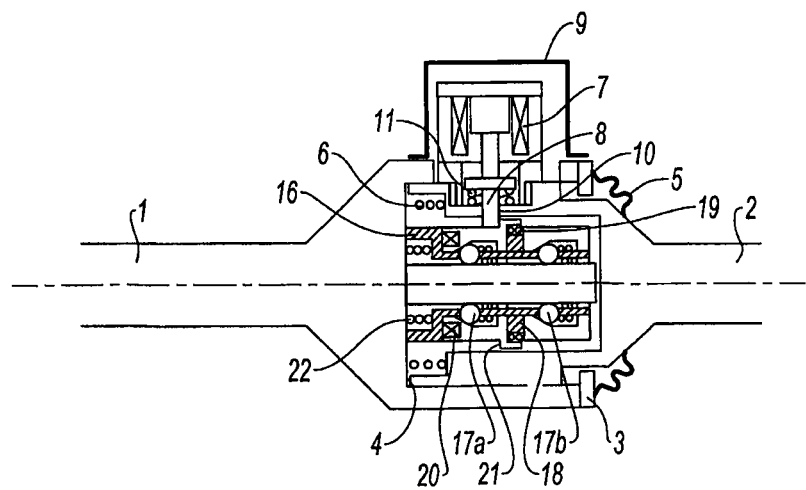

The operation of such an actuator is then as follows. From the first stable state (FIG. 2a), the two electromagnets 7, 20 are powered so that the carriage 16 is located in thrust bearing against the moving member 2 under the action of a spring 22. The rod 8 of the electromagnet 7 is then free to exit behind the penetration 21 and the electromagnet 7 closes (FIG. 2b). The electromagnet 20 for unblocking balls is then cut off then the piezoelectric structure 18 is vibrated in order to bring back the carriage 16 by driving the moving member 2 by the intermediary of the rod 8. When the carriage 16 arrives on the thrust bearing 4 corresponding to the second stable state, the power to the piezoelectric structure 18 is cut off and the actuator is ready to be triggered (FIG. 2c).

These two embodiments allow for a slow return and as such is economical in terms of energy of the moving member 2 in its second state. Furthermore, during the retaking, the actuators can be controlled without delay to shift the moving member 2 towards the first state.

Wheel mountings comprising an actuator such as described hereinabove are particularly adapted for implementing an adjustment method of the angular position of a plane of a wheel, said method providing to maintain the plane of the wheel in a second angular position during the rolling of said wheel and, in the event of detection of at least one critical rolling parameter, to activate the device for the control in such a way as to shift the wheel plane in the first angular position during a predetermined time period before the returning of said plane of the wheel in second position. In particular, such a method can be implemented on each of the wheels of an axle.

For the implementation of the method, the device for the control is connected to a system for determining at least one rolling parameter. In particular, the system for determining can use the sensors that exist in the vehicle.

As such, it is possible to maintain the rolling with a substantially zero pinch angle, which is beneficial from a point of view concerning the wear and tear on the tyre and the induced consumption. And, in the case of rolling in a situation requiring a pinch angle, to provide this angle rapidly and this during a predetermined time period in such a way as to punctually improve the dynamic behaviour of the vehicle. Furthermore, the pinch angle is not driven according to the rolling conditions of the vehicle, which facilitates its implementation in particular relative to the validation constraints of the safety functions of the vehicle.

Furthermore, in the event of failure, the actuator shifts the wheel plane in the first angular position which has a pinch angle, which corresponds to a safety position for the dynamic behaviour of the vehicle.

Moreover, the actuator can be arranged so that the time for placing in safety angular position is of a magnitude of a tenth of a second, which allows for rapid securing of the dynamic behaviour. And, the return time in second position can be greater than the time for placing in safety angular position, for example of a magnitude of a second and even a few dozen seconds. It is therefore possible to implement the adjustment method with simple actuators and at low energy consumption. Furthermore, the course of translation of the moving member 2 being low, in particular of a magnitude of the millimeter, the constraints of installation of the actuator are limited.

According to an embodiment, the time period during which the safety position is maintained can be less than 10 seconds, in particular of a magnitude of 5 seconds. Indeed, this duration is in the majority of cases sufficient to stabilise the dynamic behaviour of the vehicle.

In examples of an embodiment, the critical rolling parameter can correspond to the exceeding of a threshold value for a rolling parameter of the vehicle, said parameter able to be selected from among the lateral acceleration, the brake pressure, the rotating speed of the steering wheel.

In examples of an embodiment, the threshold value of lateral acceleration is 0.7 g, the threshold value of brake pressure is 38 bar and the threshold value of rotating speed of the steering wheel is 500°/sec. Furthermore, the critical rolling parameter can be determined according to the forward speed of the vehicle and/or of the intervention of a system for securing the dynamic behaviour of the vehicle, such as ABS or ESP.

The invention claimed is:

1. A wheel mounting of a motor vehicle by means of a wheel holder, said wheel being mounted so as to be capable of having a plane with a first angular rolling position and a second angular rolling position, said wheel mounting comprising:
   a binary actuator having a fixed member and a moving member in translation in relation to said fixed member, said moving member being secured to the wheel holder, and
   said actuator comprising a device for the binary control of the moving member in two stable states each making possible the shifting of the wheel holder,
   wherein the actuator comprises means for elastically constraining the translation of the moving member from a second of said stable states towards a first of said stable states, a device for blocking said translation in the second stable state, a thrust bearing defining the position of the moving member in the first stable state, and a motor device for returning the moving member from said first stable state towards said second stable state.

2. Wheel mounting according to claim 1, wherein the actuator is installed on a suspension arm, and each of the fixed and moving members forming a portion of said arm.

3. Wheel mounting according to claim 1, wherein the first and second rolling angular positions are selected from among a pinch angle, a camber angle and a combination of these two angles.

4. Wheel mounting according to claim 1, wherein the first stable state corresponds to an angular position wherein at least a pinch angle is non-zero, and the second stable state corresponding to an angular position wherein at least the pinch angle is substantially zero.

5. Wheel mounting according to claim 1, wherein the actuator further comprises a thrust bearing defining a position of the moving member in the second stable state.

6. Wheel mounting according to claim 1, wherein the device for blocking comprises an electromagnet secured to one of the members, a rod of said electromagnet able to be shifted in order to be engaged and respectively disengaged in the members in order to block and respectively unblock the translation.

7. Wheel mounting according to claim 6, wherein the rod is mounted in elastic constraint in relation to the member secured to the electromagnet, in such a way as to release said rod in the event of deactivation of said electromagnet.

8. Wheel mounting according to claim 6, wherein the motor device comprises a gear motor shifting a screw whereon is mounted a nut, and said nut being stopped in rotation by a wedge and forming an engage thrust bearing of the rod.

9. Wheel mounting according to claim 6, wherein the motor device comprises a carriage carrying a set of two tapered ball thrust bearings which are connected together by a structure with piezoelectric deformation and, in parallel to the latter, a means of extension spring, said device further comprising an electromagnet for unblocking balls of the thrust bearings, and one of said thrust bearings comprising an engage penetration of the rod.

10. An adjustment method for the angular rolling position of a plane of a wheel of a mounting according to claim 1, said method comprising maintaining the plane of the wheel in a second angular position during the rolling of said wheel and, in the event of detection of at least one critical rolling parameter, activating the device for the control in such a way as to shift the wheel plane in a first angular position during a predetermined time period before return of said plane of the wheel to said second angular position.

11. The adjustment method according to claim 10, further comprising corresponding a critical rolling parameter to exceeding a threshold value for a rolling parameter of the vehicle, and selecting said parameter selected from among lateral acceleration, brake pressure, and rotating speed of a steering wheel.

12. The adjustment method according to claim 10, further comprising providing return time of the wheel plane in second angular position which is greater than a time for putting in first angular position.

* * * * *